United States Patent [19]

Kunz et al.

[11] Patent Number: 5,161,862
[45] Date of Patent: Nov. 10, 1992

[54] VEHICLE HYDRAULIC BRAKE CONTROL SYSTEM

[75] Inventors: James F. Kunz; Donald R. Thomas, both of Peoria, Ill.

[73] Assignee: Komatsu Dresser Company, A General Partnership, Libertyville, Ill.

[21] Appl. No.: 684,203

[22] Filed: Apr. 12, 1991

[51] Int. Cl.[5] ............................ B60T 13/00
[52] U.S. Cl. ......................... 303/9; 303/11; 188/151 A
[58] Field of Search ............ 303/3, 9, 9.61, 11, 303/14, 15, 16; 188/151 R, 151 A

[56] References Cited

U.S. PATENT DOCUMENTS

| | | | |
|---|---|---|---|
| 3,672,729 | 6/1972 | Blakey | 303/9 |
| 4,128,276 | 12/1978 | Beck et al. | 303/9 |
| 4,166,654 | 9/1979 | Snodgrass | 303/14 |
| 4,307,916 | 12/1981 | Straut et al. | 303/15 |
| 4,758,052 | 7/1988 | Bechman et al. | 303/9 |

Primary Examiner—Robert J. Oberleitner
Assistant Examiner—Lee W. Young
Attorney, Agent, or Firm—Richards, Medlock & Andrews

[57] ABSTRACT

An improved hydraulically actuated brake system for off-road heavy vehicles is disclosed that include a first accumulator, a second accumulator, a first manual and pilot actuated brake valve for controlling the flow from the first accumulator to the front brakes and to a first and a second pressure comparing devices and a second manual and pilot actuated brake valve for controlling the flow from the second accumulator to the first and second pressue comparing devices. The higher pressure from the first and second pressure comparing devices is output to the rear brakes so the front brakes are set by the pressure in the first accumulator while the rear brakes are set by the higher pressure of the first and second accumulators. A separate manually actuated brake valve controls the flow from the second accumulator to a third pressure comparing device which also is connected to receive the output of the first manual and pilot actuated brake valve. The higher pressure from the third pressure comparing device is provided to the first and second pressure comparing devices thereby providing a system capable of applying multiple brakes through multiple controllers with separate circuits.

20 Claims, 1 Drawing Sheet

VEHICLE HYDRAULIC BRAKE CONTROL SYSTEM

TECHNICAL FIELD OF THE INVENTION

This invention relates generally to brake systems for heavy vehicles. More particularly, but not by way of limitation, this invention refers to improved apparatus for braking heavy vehicles such as those used in off-road applications wherein the improved apparatus includes braking arrangements capable of applying multiple brakes through multiple controllers with separate circuits and including the capability of automatically stopping the vehicle when system pressure becomes low.

BACKGROUND OF THE INVENTION

Braking systems for the very large and heavy off-road vehicles generally include redundant systems so that in case there is a failure in the primary system, a back-up system exists for stopping the vehicle. Some of the back-up systems are rather bulky and complex and do not always provide redundancy for some of the components of the system. Some of the back-up systems rely on redundant energy sources of complex spring applied brakes.

Accordingly, an object of this invention is to provide an improved vehicle brake control system for braking which is relatively simple in construction and operation, is purely hydraulic and provides for a multiplicity of means of controlling a single set of brakes.

SUMMARY OF THE INVENTION

This invention, in one aspect, provides an improved hydraulically actuated brake system for off-road heavy vehicles that include a first accumulator, a second accumulator, a first manual and pilot actuated brake valve for controlling the flow from the first accumulator to the front brakes and to a first and a second pressure comparing means and a second manual and pilot actuated brake valve for controlling the flow from the second accumulator to the first and second pressure comparing means. The higher pressure from the first and second pressure comparing means is output to the rear brakes so the front brakes are set by the pressure in the first accumulator while the rear brakes are set by the higher pressure of the first and second accumulators. A separate manually actuated brake valve controls the flow from the second accumulator to a third pressure comparing means which also is connected to receive the output of the first manual and pilot actuated brake valve. The higher pressure from the third pressure comparing means is provided to the first and second pressure comparing means thereby providing a system capable of applying multiple brakes through multiple controllers with separate circuits. All functions are hydraulically controlled. A stored energy system is used for emergency brake applications without relying on redundant energy sources of complex spring-applied brakes. The improved hydraulically actuated brake system provides means for applying the rear brakes regardless of whatever single component failure occurs in the brake system.

BRIEF DESCRIPTION OF THE DRAWINGS

Other advantages and features of the invention will become more apparent with reference to the following detailed description of a presently preferred embodiment thereof in connection with the accompanying drawing, wherein like reference numerals have been applied to like elements, in which the single figure is a simplified schematic diagram illustrating a vehicle brake control system that is constructed in accordance with the invention.

DETAILED DESCRIPTION

Figure 1:
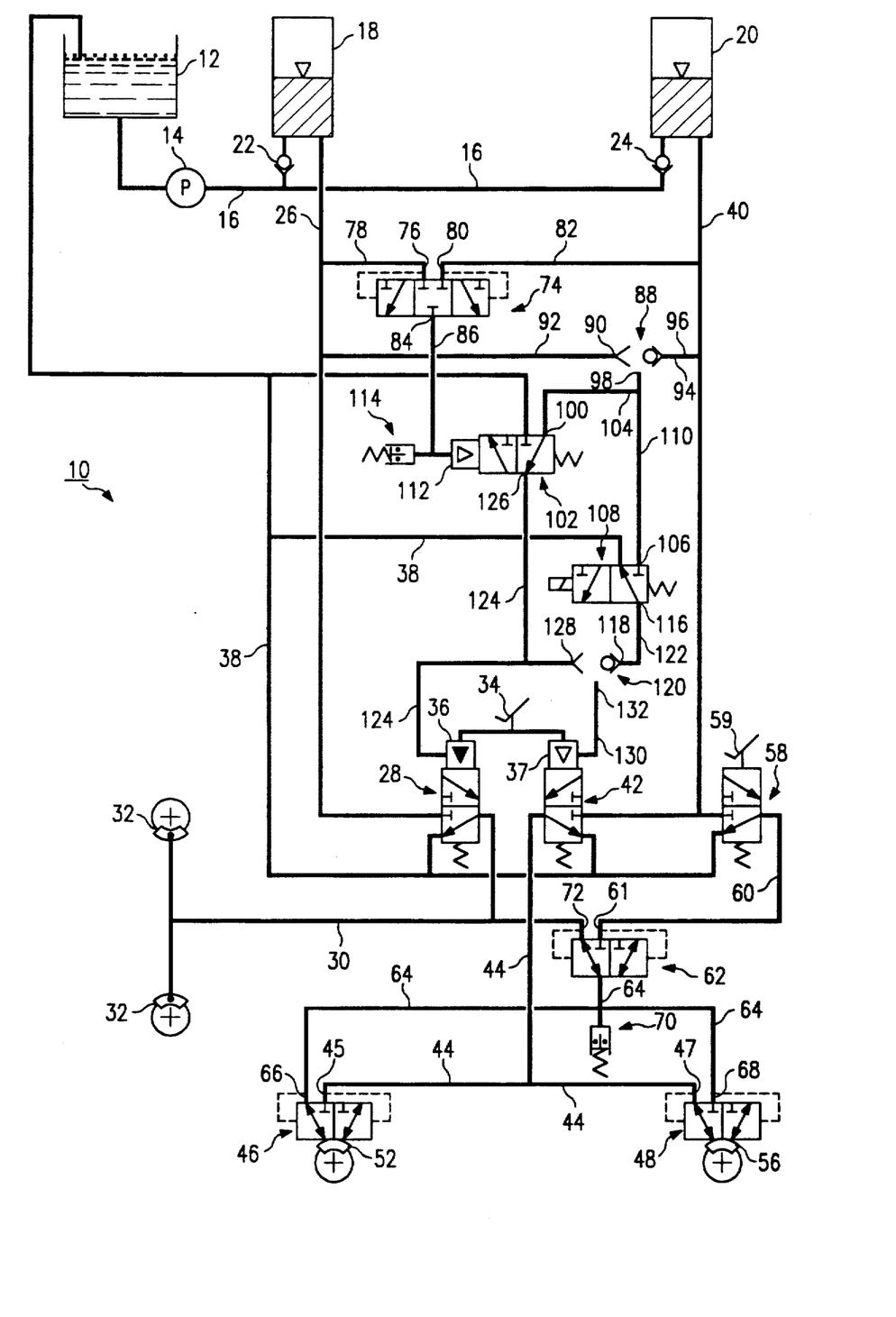

Referring to the drawing, shown therein and generally designated by the reference character 10, is a brake control system that is constructed in accordance with the invention.

The brake control system 10 comprises a hydraulic reservoir 12 that is connected to a hydraulic pump 14 which is connected by a conduit 16 to a front brake accumulator 18 and a rear brake accumulator 20, whereby reservoir 12 and pump 14 provide a source of pressurized fluid. The conduit 16 includes check valves 22 and 24 that are located upstream of the front and rear brake accumulators 18 and 20, respectively.

Front brake accumulator 18 is connected by conduit 26 to front brake valve 28 whose output is connected by conduit 30 to the front brakes 32 of the heavy vehicle (not shown). In the preferred embodiment, front brake valve 28 comprises a pedal-operated, modulated, three-way valve with hydraulic pilot over-ride. Front brake valve 28 may be actuated manually by pedal or treadle 34 or by a pilot actuator 36 which will over-ride the pedal or treadle 34. Front brake valve 28 has a return line 38 connected to hydraulic reservoir 12 which returns hydraulic fluid from the front brake valve 28 to hydraulic reservoir 12.

Rear brake accumulator 20 is connected by conduit 40 to rear brake valve 42 whose output is connected by conduit 44 to second inlet 45 of first pressure comparison means 46 and to second inlet 47 of second pressure comparison means 48. The output of first pressure comparison means 46 acts directly on the brake piston of the rear brake 52 on one side of the heavy vehicle while the output of second pressure comparison means 48 acts directly on the brake piston of the rear brake 56 on the other side of the heavy vehicle. In the preferred embodiment, rear brake valve 42 comprises a pedal-operated, modulated, three-way valve with hydraulic pilot over-ride. Rear brake valve 42 may be actuated manually by pedal 34 or by a pilot actuator 37 which will over-ridge the pedal 34. Rear brake valve 42 also has a return line 38 connected to hydraulic reservoir 12 which returns hydraulic fluid from the rear brake valve 42 to hydraulic reservoir 12. In the preferred embodiment, each of the pressure comparison means 46 and 48 comprises a pilot-operated shuttle valve for comparing the pressures in the two inlet lines 44, 64, and passing the higher pressure present in the two inlet lines 44, 64 through the outlet line of the respective pilot-operated shuttle valve 46 or 48 to the brake piston of the respective rear brake 52 or 56. In the preferred embodiment, first pressure comparison means 46 is physically mounted directly to rear brake 52 such that the output pressure from first pressure comparison means 46 acts directly on the brake piston or pistons of rear brake 52 while second pressure comparison means 48 is physically mounted directly to rear brake 56 such that the output pressure from second pressure comparison means 48 acts directly on the brake piston or pistons of rear brake 56. It will be appreciated that pressure comparison means 46 and 48 could be physically mounted at a location remote from rear brakes 52 and 56 and connected thereto by conduit but this type of mounting and connecting would reduce the reliability and increase the possibility of a failure in the system by introducing additional conduits which could fail.

Rear brake accumulator 20 is also connected by conduit 40 to auxiliary brake valve 58 whose output is connected by conduit 60 to second inlet 61 of third pressure comparison means 62 which is identical to pressure comparison means 46 and 48. Auxiliary brake valve 58 is actuated manually by a lever, pedal or treadle 59. The outlet of third pressure comparison means 62 is connected by conduit 64 to first inlet 66 of first pressure comparison means 46 and to first inlet 68 of second pressure comparison means 48. Conduit 64 is also connected to brake warning device 70 which in the preferred embodiment comprises a normally-open hydraulic pressure switch for completing a stop-light electrical circuit. Conduit 30 from front brake valve 28 is also connected to first inlet 72 of third pressure comparison means 62.

The pressures in conduits 26 and 40 are compared by fourth pressure comparison means 74 with conduit 26 connected to inlet 76 by conduit 78 and with conduit 40 connected to inlet 80 by conduit 82. In the preferred embodiment, fourth pressure comparison means 74 comprises a pilot-operated shuttle valve for the purpose of comparing the two accumulator pressures in conduits 26 and 40 and allowing the lower of the two accumulator pressures to pass through outlet 84 which is connected to conduit 86.

The pressures in conduits 26 and 40 are also compared by fifth pressure comparison means or shuttle valve 88 with conduit 26 connected to inlet 90 by conduit 92 and with conduit 40 connected to inlet 94 by conduit 96. Outlet 98 allows the higher pressure of the two compared pressures to pass to inlet port 100 of trigger valve 102 through conduit 104 and to inlet 106 of brake lock valve 108 through conduit 110.

Conduit 86 is connected to the pilot port of pilot actuator 112 of trigger valve 102 and to brake pressure warning device 114. In the preferred embodiment, trigger valve 102 comprises a two-position, three-way, hydraulically-piloted valve for comparing the pressure from fourth pressure comparing means 74 on conduit 86 against a spring force and thereby controlling the flow of high pressure accumulator fluid from fifth pressure comparison means 88 via conduit 104. The spring force is set at a value requiring accumulator pressure in excess of full brake apply pressure to release the pilot.

The outlet 116 of brake lock 108 is connected to inlet 118 of sixth pressure comparison means or shuttle Valve 120 by conduit 122. Conduit 124 is connected from outlet port 126 of trigger valve 102 to inlet 128 of sixth pressure comparison means 120 and pilot actuator 36 of front brake valve 28. Conduit 130 connects the high pressure outlet 132 of sixth pressure means 120 to pilot actuator 37 of rear brake valve 42. In the preferred embodiment, brake lock valve 108 comprises a two-position, three-way electrically-shifted valve for purposes of manually controlling the flow of high pressure accumulator oil from fifth pressure comparison means 88. Control of brake lock valve 108 is accomplished through a dash-mounted switch.

Normal Operation—Normal operation of the system occurs when hydraulic pump 14 is operating to provide sufficient hydraulic fluid at a pressure of about 2750 p.s.i. Brake pressure warning device 114 is set at about 2000 p.s.i. so that a warning will sound when the pressure in conduit 86 drops below that value. Also, trigger valve 102 has been set so that pilot actuator 112 will actuate trigger valve 102 when the pressure in conduit 86 reaches a value of 1650 p.s.i. or lower.

With the vehicle operating under normal conditions, the operator can depress pedal 34 which manually operates both the front brake valve 28 and the rear brake valve 42. At that time, pressure from front brake accumulator 18 is fed through conduit 26 to the front brake valve 28 and then through conduit 30 to front brakes 32, setting those brakes. Pressure is also fed through conduit 30 to first inlet 72 of third pressure comparison means 62. Since second inlet 61 of third pressure comparison means 62 is vented to atmospheric, pressure from conduit 30 is fed through to conduit 64 and to first inlet 66 of first pressure comparison means 46 and to first inlet 68 of second pressure comparison means 48. At the same time, pressure from rear brake accumulator 20 is fed through conduit 40 to the rear brake valve 42 and then through conduit 44 to second inlet 45 of first pressure comparison means 46 and to second inlet 47 of second pressure comparison means 48. First pressure comparison means 46 and second pressure comparison means 48 then pass the higher of the pressures in conduits 44 and 64 through to rear brakes 52 and 56, setting those brakes. As will be appreciated, the invention provides for the rear brakes to be set by either the rear brake valve 42 or the front brake valve 28, whichever has the higher output pressure during normal operation.

Low Pressure in the Front Brake System—When any malfunction occurs which lowers the pressure in the front brake accumulator 18, and/or the system associated therewith, below the value of 1650 p.s.i., then that low pressure is passed through fourth pressure comparison means 74 and is applied to brake pressure warning device 114 and pilot actuator 112 through conduit 86. Brake pressure warning device 114 is activated to warn the driver of a malfunction. Pilot actuator 112 causes trigger valve 102 to move to a position wherein conduit 104 is connected through trigger valve 102 to conduit 124.

At the same time, fifth pressure comparison means 88 passes the higher pressure (from conduit 40) of the two pressures to conduit 104 and conduit 110. Trigger valve 102 is positioned, as set forth above, to allow the pressure in conduit 104 to pass through to conduit 124 and to inlet 128 of sixth pressure comparison means 120 and pilot actuator 36 of front brake valve 28. The pressure at inlet 128 passes through sixth pressure comparison means 120 to conduit 130 and to pilot actuator 37 of rear brake valve 42.

As previously mentioned, the application of pressure to the pilot actuator overrides the manual operation by pedal 34. Therefore, pilot actuator 37 causes rear brake valve 42 to be shifted to a position wherein conduit 40 is connected to conduit 44 at the higher normal accumulator pressure (2750 p.s.i.) and pilot actuator 36 causes front brake valve 28 to be shifted to a position wherein conduit 26 is connected to conduit 30 to set front brakes 32 at whatever pressure is available in conduit 26.

Third pressure comparison means 62 passes the pressure in conduit 30 (assuming it is higher than atmospheric) to conduit 64. First pressure comparison means 46 and second pressure comparison means 48 pass the higher pressure in conduit 44 to set rear brakes 52 and 56. Once the pilot actuator 36 and 37 of brake valves 28 and 42, respectively, have been actuated, front brakes 32 and rear brakes 52 and 56 will remain set until the pressure bleeds off or the pressure in the brake control system 10 is increased to normal whereby normal operation of the brake control system 10 can be resumed. As will be appreciated, the invention provides for automatic means of setting the rear brakes under the normal full pressure in the event the vehicle operator ignores the output of the brake pressure warning device or is unaware of the loss of available braking energy in the braking system for the front brakes under normal operation.

Low Pressure in the Rear Brake System—When any malfunction occurs which lowers the pressure in the rear brake accumulator 20 and/or the system associated therewith, below the value of 1650 p.s.i., that portion of the system which activates pilot actuators 36 and 37 operates as previously described with regard to low pressure in the front brake system. As before, conduit 26 is connected to conduit 30 at the higher, normal accumulator pressure (2750 p.s.i.) to set the front brakes 32. Third pressure comparison means 62 passes the pressure in conduit 30 to conduit 64. First pressure comparison means 46 and second pressure comparison means 48 pass the higher pressure in conduit 64 to set the rear brakes 52 and 56 with the higher pressure. As will be appreciated, the invention provides for automatic means of setting the rear brakes and the front brakes under the normal full pressure in the event the vehicle operator ignores the output of the brake pressure warning device or is unaware of the loss of available braking energy in the braking system for the rear brakes under normal operation.

Manual Brake Lock—The brake system is also designed such that the vehicle operator can immediately set the rear brakes 52 and 56 for any reason and without using pedals 34 and/or 59. As stated previously, fifth pressure comparison means 88 compares the pressures in conduits 26 and 40 and provides the higher pressure on conduit 110 which is applied to inlet 106 of brake lock valve 108. In the preferred embodiment, brake lock valve 108 comprises a two-position, three-way, electrically-shifted valve for controlling the flow of high pressure accumulator fluid from conduit 110. Control of brake lock valve 108 is accomplished through a dash-mounted switch. Normally brake lock valve 108 is in a position of blocking pressure from entering conduit 122. When the vehicle operator manually activates brake lock valve 108, conduit 110 is placed in communication with conduit 122. When this occurs, high pressure (2750 p.s.i.) is placed on input 118 of sixth pressure comparison means 120 while input 128 is at atmospheric pressure. Therefore, high pressure is passed through sixth pressure comparison means 120 to conduit 130 and activates pilot actuator 37 causing rear brake valve 42 to be shifted to a position wherein conduit 40 is connected to conduit 44. First and second pressure comparison means 46 and 48 pass the higher pressure in conduit 44 through to set rear brakes 52 and 56. To return to normal operation, it is necessary to manually reset the brake lock valve 108 to its initial position which connects the pilot actuator 37 to conduit 38 through conduit 130, sixth pressure comparison means 120, conduit 122 and brake lock valve 108. With the pressure released on the pilot actuator 37, rear brake valve 42 can then be actuated by pedal 34. As will be appreciated, the invention provides a means to apply a single set of brakes which is separate from the normal brake system and from the automatic system of applying the brakes when a malfunction occurs.

Auxiliary Braking—The brake system is also designed such that the vehicle operator can immediately apply a single set of brakes for any reason and without using pedal 34 or the manual brake lock system. In the preferred embodiment, the single set of brakes comprises the rear brakes 52 and 56 but it will be appreciated that the single set of brakes could be the front brakes 32. Rear brake accumulator 20 is connected by conduit 40 to auxiliary brake valve 58, which when actuated by depression of pedal 59, connects conduit 40 to conduit 60. Third pressure comparison means 62 passes the pressure in conduit 60 to conduit 64 since the pressure at inlet 72 is at atmospheric. First and second pressure comparison means 46 and 48 pass the pressure in conduit 64 to set rear brakes 52 and 56, respectively, since the pressure in conduit 44 is at atmospheric. As will be appreciated, the invention provides a redundant system to manually set a lo predetermined set of brakes.

In the event the vehicle operator depresses pedals 34 and 59 at generally the same time, for whatever reason, and the brake system is operating normally, pressure in conduit 26 will pass through front brake valve 28 to conduit 30 and to front brakes 32, setting those brakes. Pressure in conduit 30 passes to first inlet 72 of third pressure comparison means 62. At the same time, pressure in conduit 40 will pass though rear brake valve 42 to conduit 44 and to second inlet 45 of first pressure comparison means 46 and to second inlet 47 of second pressure comparison means 48. Also, at the same time, pressure in conduit 40 will pass through auxiliary brake valve 58 to conduit 60 and to second inlet 61 of third pressure comparison means 62 which passes the higher of the pressures on conduits 30 and 60 to conduit 64 and to first inlet 66 of first pressure comparison means 46 and to first inlet 68 of second pressure comparison means 48. First pressure comparison means 46 and second pressure comparison means 48 pass the higher of the pressures on conduits 64 and 44, respectively, through to set rear brakes 52 and 56 with the higher pressure available.

Although the present invention has been described with reference to a presently preferred embodiment, it will be appreciated by those skilled in the art that various modifications, alternatives, variations, etc., may be made without departing from the spirit and scope of the invention as defined in the appended claims.

We claim:

1. An improved hydraulic brake system for heavy vehicles including a first set of brakes and a second set of brakes, the improvement comprising:
   a source of pressurized hydraulic fluid;
   first and second accumulators connected with said source of pressurized hydraulic fluid;
   first hydraulic brake valve means having an inlet connected to said first accumulator, said first hydraulic brake valve means having an outlet connected to the first set of brakes, said first hydraulic brake valve means having a first position wherein said inlet is connected to said outlet and a second position wherein said inlet is disconnected from said outlet, said first hydraulic brake valve means having an actuator adapted to move said first hydraulic brake valve means from said second position of said first hydraulic brake valve means to said first position of said first hydraulic brake valve means to thereby connect said inlet of said first hydraulic brake valve means to said outlet of said first hydraulic brake valve means;

second hydraulic brake valve means having an inlet connected to said second accumulator, said second hydraulic brake valve means having an outlet, said second hydraulic brake valve means having a first position wherein said inlet of said second hydraulic brake valve means is connected to said outlet of said second hydraulic brake valve means and a second position wherein said inlet of said second hydraulic brake valve means is disconnected from said outlet of said second hydraulic brake valve means, said second hydraulic brake valve means having an actuator adapted to move said second hydraulic brake valve means from said second position of said second hydraulic brake valve means to said first position of said second hydraulic brake valve means to thereby connect said inlet of said second hydraulic valve means to said outlet of said second hydraulic valve means;

first pressure comparing means having a first inlet connected to said outlet of said first hydraulic brake valve means, said first pressure comparing means having a second inlet connected to said outlet of said second hydraulic brake valve means, said first pressure comparing means having a high pressure outlet for passing the higher of the pressure at the first inlet of said first pressure comparing means and the pressure at the second inlet of said first pressure comparing means, said high pressure outlet of said first pressure comparing means being connected to a predetermined one of the second set of brakes; and second pressure comparing means having a first inlet connected to said outlet of said first hydraulic brake valve means, said second pressure comparing means having a second inlet connected to said outlet of said second hydraulic brake valve means, and said second pressure comparing means having a high pressure outlet for passing the higher of the pressure at the first inlet of said second pressure comparing means and the pressure at the second inlet of said second pressure comparing means, said high pressure outlet of said second pressure comparing means being connected to a different predetermined one of the second set of brakes;

whereby said first set of brakes are applied by the pressure in said first accumulator and said second set of brakes are applied by the higher of the pressure in said first accumulator and the pressure in said second accumulator.

2. A brake system in accordance with claim 1 further including a third hydraulic brake valve means having an inlet connected to a predetermined one of said first and second accumulators, said third hydraulic brake valve means having an outlet, said third hydraulic brake valve means having a first position wherein said inlet of said third hydraulic brake valve means is connected to said outlet of said third hydraulic brake valve means and a second position wherein said inlet of said third hydraulic brake valve means is disconnected from said outlet of said third hydraulic brake valve means, and a manual actuator to move said third hydraulic brake valve means from said second position of said third hydraulic brake valve means to said first position of said third hydraulic brake means to thereby connect said inlet of said third hydraulic brake valve means to said outlet of said third hydraulic brake valve means; and third pressure comparing means having a first inlet connected to said outlet of said first hydraulic brake valve means, said third pressure comparing means having a second inlet connected to said outlet of said third hydraulic brake valve means, and said third pressure comparing means having a high pressure outlet for passing the higher of the pressure at the first inlet of said third pressure comparing means and the pressure at the second inlet of said third pressure comparing means, said high pressure outlet of said third pressure comparing means being connected to said first inlet of said first pressure comparing means and to said first inlet of said second pressure comparing means.

3. A brake system in accordance with claim 2 wherein said actuator of said first hydraulic brake valve means comprises a pilot actuator, said first hydraulic brake valve means also being adapted to be moved by a manual actuator from said second position of said first hydraulic brake valve means to said first position of said first hydraulic brake valve means; and wherein said actuator of said second hydraulic brake valve means comprises a pilot actuator, said second hydraulic brake valve means also being adapted to be moved by a manual actuator from said second position of said second hydraulic brake valve means to said first position of said second hydraulic brake valve means.

4. A brake system in accordance with claim 3 further including a fourth pressure comparing means having a first inlet connected to said first accumulator, said fourth pressure comparing means having a second inlet connected to said second accumulator, and said fourth pressure comparing means having a low pressure outlet for passing the lower of the pressure at the first inlet of said fourth pressure comparing means and the pressure at the second inlet of said fourth comparing means;

fifth pressure comparing means having a first inlet connected to said first accumulator, said fifth pressure comparing means having a second inlet connected to said second accumulator, and said fifth pressure comparing means having a high pressure outlet for passing the higher of the pressure at the first inlet of said fifth pressure comparing means and the pressure at the second inlet of said fifth pressure comparing means;

a pilot actuated trigger valve having a pilot port connected to said lower pressure outlet of said fourth pressure comparing means, said pilot actuated trigger valve having an inlet port connected to said high pressure outlet of said fifth comparing means, said pilot actuated trigger valve having an outlet port connected to said pilot actuators of said first and second hydraulic brake valve means;

whereby said pilot actuated trigger valve is actuated when the pressure to said pilot port is below a predetermined value to permit flow from said inlet port to said outlet port to said pilot actuator of said first hydraulic brake valve means, overriding any manual actuator of said first hydraulic brake valve means, and actuating said first hydraulic brake valve means to supply available pressure from said first accumulator to said first set of brakes and to said first inlet of said third pressure comparing means, to permit flow from said inlet port to said outlet port to said pilot actuator of said second hydraulic brake valve means, overriding any manual actuator of said second hydraulic brake valve means, and actuating said second hydraulic brake valve means to supply available pressure from said second accumulator to said second inlet of said first pressure comparing means and to said second inlet of said second pressure comparing means.

5. A brake system in accordance with claim 4 further including a manually-actuated brake lock valve having an inlet connected to said high pressure outlet of said fifth pressure comparing means, said manually-actuated brake lock valve having an outlet; and

- a sixth pressure comparing means having an inlet connected to the outlet of said brake lock valve, said sixth pressure comparing means having an inlet connected to said outlet port of said pilot actuated trigger valve, and said sixth pressure comparing means having an outlet connected to said pilot actuator of said second hydraulic brake valve means;
- whereby manual actuation of said manually-actuated brake lock valve connects the high pressure outlet of said fifth pressure comparing means to said pilot actuator of said second hydraulic brake valve means through said sixth pressure comparing means to actuate said second hydraulic brake valve means.

6. A brake system in accordance with claim 3 further comprising a manual actuator for actuating said first hydraulic brake valve means and for actuating said second hydraulic brake valve means.

7. A brake system in accordance with claim 1 wherein said first pressure comparing means is physically mounted to said predetermined one of said second set of brakes whereby the pressure from the high pressure outlet of said first pressure comparing means acts directly on said predetermined one of said second set of brakes to apply said predetermined one of said second set of brakes.

8. A brake system in accordance with claim 2 wherein said second pressure comparing means is physically mounted to said different predetermined one of said second set of brakes whereby the pressure from the high pressure outlet of said second pressure comparing means acts directly on said different predetermined one of said second set of brakes to apply said different predetermined one of said second set of brakes.

9. A hydraulic brake system for vehicles including a first set of brakes and a second set of brakes, the brake system comprising:

a source of pressurized hydraulic fluid;

first and second accumulators connected with said source of pressurized hydraulic fluid;

a first hydraulic brake valve having an inlet connected to said first accumulator, said first hydraulic brake valve having an outlet connected to the first set of brakes, said first hydraulic brake valve having a first position wherein said inlet is connected to said outlet and a second position wherein said inlet is disconnected form said outlet, said first hydraulic brake valve having an actuator adapted to move said first hydraulic brake valve from said second position of said first hydraulic brake valve to said first position of said first hydraulic brake valve to thereby connect said inlet of said first hydraulic brake valve to said outlet of said first hydraulic brake valve;

a second hydraulic brake valve having an inlet connected to said second accumulator, said second hydraulic brake valve having an outlet, said second hydraulic brake valve having a first position wherein said inlet of said second hydraulic brake valve is connected to said outlet of said second hydraulic brake valve and a second position wherein said inlet of said second hydraulic brake valve is disconnected from said outlet of said second hydraulic brake valve, said second hydraulic brake valve having an actuator adapted to move said second hydraulic brake valve from said second position of said second hydraulic brake valve to said first position of said second hydraulic brake valve to thereby connect said inlet of said second hydraulic valve to said outlet of said second hydraulic valve;

a first pressure comparator having a first inlet connected to said outlet of said first hydraulic brake valve, said first pressure comparator having a second inlet connected to said outlet of said second hydraulic brake valve, said first pressure comparator having a high pressure outlet for passing the higher of the pressure at the first inlet of said first pressure comparator and the pressure at the second inlet of said first pressure comparator, said high pressure outlet of said first pressure comparator being connected to a predetermined one of the second set of brakes; and a second pressure comparator having a first inlet connected to said outlet of said first hydraulic brake valve, said second pressure comparator having a second inlet connected to said outlet of said second hydraulic brake valve, and said second pressure comparator having a high pressure outlet for passing the higher of the pressure at the first inlet of said second pressure comparator and the pressure at the second inlet of said second pressure comparator, said high pressure outlet of said second pressure comparator being connected to a different predetermined one of the second set of brakes;

whereby said first set of brakes are applied by the pressure in said first accumulator and said second set of brakes are applied by the higher of the pressure in said first accumulator and the pressure in said second accumulator.

10. A brake system in accordance with claim 9 further including a third hydraulic brake valve having an inlet connected to a predetermined one of said first and second accumulators, said third hydraulic brake valve having an outlet, said third hydraulic brake valve having a first position wherein said inlet of said third hydraulic brake valve is connected to said outlet of said third hydraulic brake valve and a second position wherein said inlet of said third hydraulic brake valve is disconnected from said outlet of said third hydraulic brake valve, and a manual actuator to move said third hydraulic brake valve from said second position of said third hdyraulic brake valve to said first position of said third hydraulic brake to thereby connect said inlet of said third hydraulic brake valve to said outlet of said third hydraulic brake valve; and a third pressure comparator having a first inlet connected to said outlet of said first hydraulic brake valve, said third pressure comparator having a second inlet connected to said outlet of said third hydraulic brake valve, and said third pressure comparator having a high pressure outlet for passing the higher of the pressure at the first inlet of said third pressure comparator and the pressure at the second inlet of said third pressure comparator, said high pressure outlet of said third pressure comparator being connected to said first inlet of said first pressure comparator and to said first inlet of said second pressure comparator.

11. A brake system in accordance with claim 10 wherein said actuator of said first hydraulic brake valve comprises a pilot actuator, said first hydraulic brake a valve also being adapted to be moved by a manual actuator from said second position of said first hydraulic brake valve to said first position of said first hydraulic brake valve; and wherein said actuator of said second hydraulic brake valve comprises a pilot actuator, said second hydraulic brake valve also being adapted to be moved by a manual actuator from said second position of said second hydraulic brake valve to said first position of said second hydraulic brake valve.

12. A brake system in accordance with claim 11 further including a fourth pressure comparator having a first inlet connected to said first accumulator, said fourth pressure comparator having a second inlet connected to said second accumulator, and said fourth pressure comparator having a low pressure outlet for passing the lower of the pressure at the first inlet of said fourth pressure comparator and the pressure at the second inlet of said fourth comparator;

a fifth pressure comparator having a first inlet connected to said first accumulator, said fifth pressure comparator having a second inlet connected to said second accumulator, and said fifth pressure comparator having a high pressure outlet for passing the higher of the pressure at the first inlet of said fifth pressure comparator and the pressure at the second inlet of said fifth pressure comparator;

a pilot actuated trigger valve having a pilot port connected to said low pressure outlet of said fourth pressure comparator, said pilot actuated trigger valve having an inlet port connected to said high pressure outlet of said fifth comparator, said pilot actuated trigger valve having an outlet port connected to said pilot actuators of said first and second hydraulic brake valves;

whereby said pilot actuated trigger valve is actuated when the pressure to said pilot port is below a predetermined value to permit flow from said inlet port to said outlet port to said pilot actuator of said first hydraulic brake valve, overriding any manual actuator of said first hydraulic brake valve, and actuating said first hydraulic brake valve to supply available pressure from said first accumulator to said first set of brakes and to said first inlet of said third pressure comparator, to permit flow from said inlet port to said outlet port to said pilot actuator of said second hydraulic brake valve, overriding any manual actuator of said second hydraulic brake valve, and actuating said second hydraulic brake valve to supply available pressure from said second accumulator to said second inlet of said first pressure comparator and to said second inlet of said second pressure comparator.

13. A brake system in accordance with claim 12 further including a manually-actuated brake lock valve having an inlet connected to said high pressure outlet of said fifth pressure comparator, said manually-actuated brake lock valve having an outlet; and a sixth pressure comparator having an inlet connected to the outlet of said brake lock valve, said sixth pressure comparator having an inlet connected to said outlet port of said pilot actuated trigger valve, and said sixth pressure comparator having an outlet connected to said pilot actuator of said second hydraulic brake valve;

whereby manual actuation of said brake lock valve connects the high pressure outlet of said fifth pressure comparator to said pilot actuator of said second hydraulic brake valve through said sixth pressure comparator to actuate said second hydraulic brake valve.

14. A brake system in accordance with claim 13 further comprising a manual actuator for actuating said first hydraulic brake valve and for actuating said second hydraulic brake valve.

15. A brake system in accordance with claim 14 wherein said first pressure comparator is physically mounted to said predetermined one of said second set of brakes whereby the pressure from the high pressure outlet of said first pressure comparator acts directly on said predetermined one of said second set of brakes to apply said predetermined one of said second set of brakes.

16. A brake system in accordance with claim 15 wherein said second pressure comparator is physically mounted to said different predetermined one of said second set of brakes whereby the pressure from the high pressure outlet of said second pressure comparator acts directly on said different predetermined one of said second set of brakes to apply said different predetermined one of said second set of brakes.

17. A brake system in accordance with claim 9 wherein said first pressure comparator is physically mounted to said predetermined one of said second set of brakes whereby the pressure from the high pressure outlet of said first pressure comparator acts directly on said predetermined one of said second set of brakes to apply said predetermined one of said second set of brakes.

18. A brake system in accordance with claim 17 wherein said second pressure comparator is physically mounted to said different predetermined one of said second set of brakes whereby the pressure from the high pressure outlet of said second pressure comparator acts directly on said different predetermined one of said second set of brakes to apply said different predetermined one of said second set of brakes.

19. A brake system in accordance with claim 9 wherein said actuator of said first hydraulic brake a valve comprises a pilot actuator, said first hydraulic brake valve also being adapted to be moved by a manual actuator from said second position of said first hydraulic brake valve to said first position of said first hydraulic brake valve; wherein said actuator of said second hydraulic brake valve comprises a pilot actuator, said second hydraulic brake valve also being adapted to be moved by a manual actuator from said second position of said second hydraulic brake valve to said first position of said second hydraulic brake valve; and wherein said brake system further comprises a manual actuator for actuating said first hydraulic brake valve and for actuating said second hydraulic brake valve.

20. A brake system in accordance with claim 9 wherein said actuator of said second hydraulic brake valve comprises a pilot actuator, said brake system further including a third pressure comparator having a first inlet connected to said first accumulator, said third pressure comparator having a second inlet connected to said second accumulator, and said third pressure comparator having a high pressure outlet for passing the higher of the pressure at the first inlet of said third pressure comparator and the pressure at the second inlet of said third comparator; and a manually-actuated brake lock valve having an inlet connected to said high pressure outlet of said third pressure comparator, said manually-actuated brake lock valve having an outlet connected to said pilot actuator of said second hydraulic brake valve;

whereby manual actuation of said manually-actuated brake lock valve connects the high pressure outlet of said third pressure comparator to said pilot actuator of said second hydraulic brake valve to actuate said second hydraulic brake valve.

* * * * *

UNITED STATES PATENT AND TRADEMARK OFFICE
CERTIFICATE OF CORRECTION

PATENT NO. : 5,161,862

DATED : November 10, 1992

INVENTOR(S) : James F. Kunz et al

It is certified that error appears in the above-identified patent and that said Letters Patent is hereby corrected as shown below:

Column 1, line 66, change "Will" to --will--.

Column 3, line 52, change "Valve" to --valve--.

Column 5, line 56, change "Wherein" to --wherein--.

Column 6, line 20, change "a lo predetermined" to --a predetermined--.

Column 8, line 47, change "lower" to --low--.

Column 9, line 37, change "claim 2" to --claim 7--.

Column 9, line 57, change "form" to --from--.

Column 10, line 56, change "hdyraulic" to --hydraulic--.

UNITED STATES PATENT AND TRADEMARK OFFICE
CERTIFICATE OF CORRECTION

PATENT NO. : 5,161,862

DATED : November 10, 1992

INVENTOR(S) : James F. Kunz et al

It is certified that error appears in the above-indentified patent and that said Letters Patent is hereby corrected as shown below:

Column 11, lines 7-8, change "brake a valve" to --brake valve --.

Column 12, lines 47-48, change "brake a valve" to --brake valve --.

Signed and Sealed this

First Day of March, 1994

Attest:

BRUCE LEHMAN

*Attesting Officer*   Commissioner of Patents and Trademarks